United States Patent [19]

Murad

[11] 4,146,757
[45] Mar. 27, 1979

[54] FINGER RING MICROPHONE

[76] Inventor: Jerry Murad, 19543 Dartmouth Pl., Northville, Mich. 48167

[21] Appl. No.: 854,692

[22] Filed: Nov. 25, 1977

[51] Int. Cl.² .............................................. H04M 1/04
[52] U.S. Cl. ................................................... 179/157
[58] Field of Search .............. 298/314; 224/0.5, 28 R, 224/28 F; 179/157

[56] References Cited

U.S. PATENT DOCUMENTS

| 1,026,196 | 5/1912 | Beck | 179/114 R |
| 1,286,610 | 12/1918 | Harriman | 224/28 F |
| 2,222,741 | 11/1940 | Bush | 224/28 F |
| 3,189,310 | 6/1965 | Trueson | 248/314 |
| 3,596,964 | 8/1971 | Zazzara | 224/28 F X |

Primary Examiner—William C. Cooper
Attorney, Agent, or Firm—Krass & Young

[57] ABSTRACT

A microphone support assembly for use by a harmonica player or the like includes an adjustable size ring adapted to surround a finger of the wearer and a cylindrical, open ended case affixed to the ring at an outer edge thereof. A microphone element is adapted to be inserted within the case and the microphone wires attach to an electrical connector supported on a strap supported on the user's wrist. The connector allows attachment to external amplifier circuitry.

15 Claims, 3 Drawing Figures

FINGER RING MICROPHONE

BACKGROUND OF THE INVENTION

1. Field of the Invention

This invention relates to a support structure for a microphone adapted to be secured to the finger of a wearer and to associated elements for connecting the microphone to an external amplifier.

2. Description of the Prior Art

A variety of body-supported microphones have been developed in response to the limitations of floor stand supported microphones and the like with respect to mobility when used by musical instrumentalists and singers. These body supported microphones have included chest harnesses adapted to carry a microphone element forwardly of the performer's chest. U.S. Pat. No. 3,928,734 discloses a microphone mount including a band which encircles the neck of the wearer.

While these body supported microphones provided the required mobility for performers on certain types of instruments, they have generally proved inadequate for picking up sound from harmonicas because of the interference the support structures caused with the hand movements of the harmonica player and variations in sound level produced when the harmonica is moved relative to the body supported microphone.

The present invention is broadly directed toward a microphone support structure particularly suited for the needs of players of harmonicas and the like which is convenient in use, low in cost, and provides excellent pick-up of the harmonica's sound.

SUMMARY OF THE INVENTION

The present invention broadly takes the form of a microphone supported on an outer side of a finger ring so that it may be positioned in the hand of the player, in close proximity to a harmonica being played, and will afford the user complete mobility without producing any variation in the sound intensity level. The invention is further directed to an associated structure for supporting the microphone wire or cable without producing any forces on the microphone element, and allowing convenient and reliable electrical connection to an amplifier system.

In the preferred embodiment of the invention, which will subsequently be disclosed in detail, the microphone support takes the form of an adjustable diameter finger ring having a cylindrical, open ended casing affixed to the outer edge of the perimeter at one side. The central axis of the casing is aligned parallel to a tangent to the ring at the point of connection between the casing and the ring, in the plane of the ring. The cylindrical casing has a longitudinal slot along its side extending into the open end. A cylindrical microphone element may be positioned within the casing so that its diaphragm is exposed to the open end of the casing and the microphone cable may be positioned to pass through the slot in the casing side.

A preferred embodiment of the invention further includes a wrist strap supporting an electrical connector. The microphone cable is wired to the connector and an external amplifier system may be connected to the amplifier through a complementary detachable cable connector. The microphone cable thus trails from the wrist strap and any forces imposed by pulling the cable are absorbed in the wrist band and are not communicated to the relatively delicate finger ring mechanism.

The microphone is positioned in close proximity to a harmonica held by the user, but does not in any way interfere with the user's manual dexterity.

Other objectives, advantages and applications of the present invention will be made apparent by the following detailed description of the preferred embodiment. The description makes reference to the accompanying drawings in which.

Figure 1:
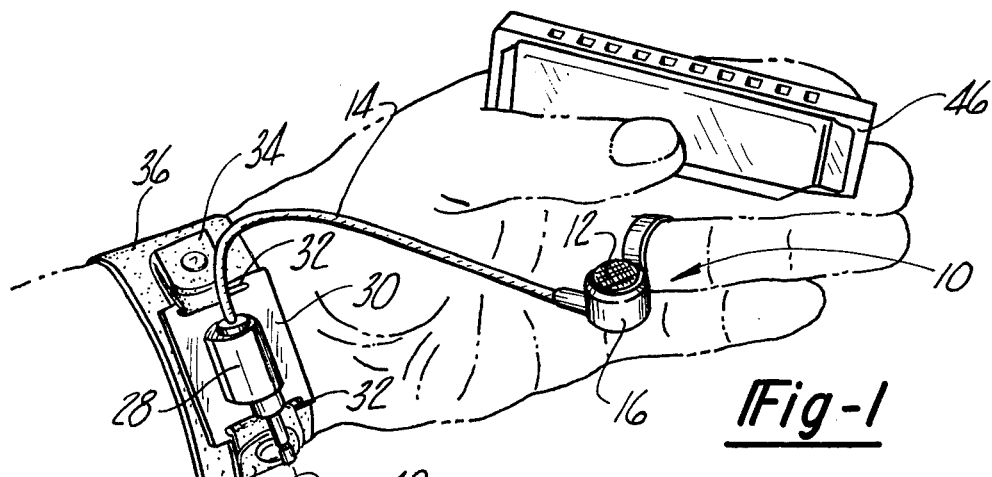
FIG. 1 is a perspective view of a preferred embodiment of the present invention secured to the hand and wrist of a harmonica player.
Figure 2:
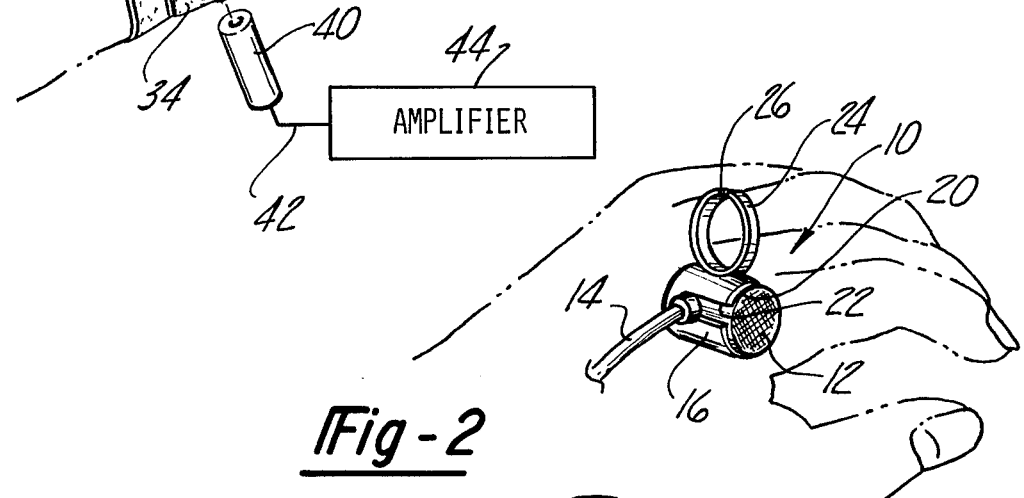
FIG. 2 is a detailed perspective view of the microphone and support housing containing the microphone element, with the user's hand shown in phantom.
Figure 3:
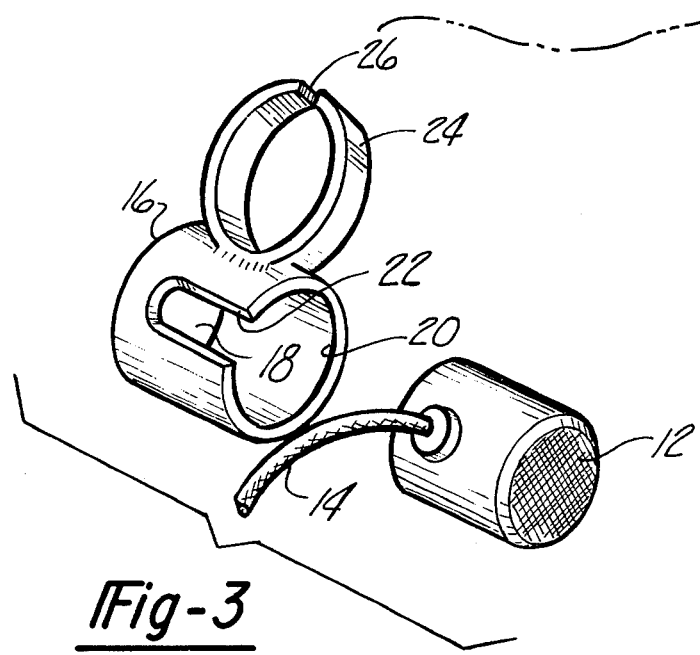
FIG. 3 is a perspective view of the ring and housing of the microphone element shown in exploded position.

Referring to the drawings, the preferred embodiment of the invention is adapted to employ a commercially available microphone element, generally indicated at 10. Other forms of microphone elements could be employed in alternative embodiments of the invention, or the microphone element might be formed integrally with the ring support apparatus in other embodiments of the invention.

The microphone element 10 is cylindrical in shape and has a grill 12 at one end adapted to protect the microphone diaphragm. A cable 14 extends from the microphone element and provides electrical connection thereto.

The element 10 is adapted to be inserted within a cylindrical casing 16 having one partially closed end 19 and an opposite open end 20. A slot 22 is formed in the cylindrical casing side and communicates with the opening 20. The element 10 is adapted to be inserted into the open end 20 of the casing with the microphone cable 14 extending through the slot 22. The interior diameter of the casing preferably makes a press fit with the outer diameter of the microphone and the interior depth of the casing just accommodates the microphone so that the grid 12 fills the opening 20 in the casing. The casing is preferably formed of plastic, but could be formed of metal. The preferable method of forming is injection molding but other forming techniques could be employed.

A finger ring section 24 has a portion of its outer perimeter secured to the outer, cylindrical side of the casing 16. The ring 24 is preferably arranged with its central axis normal to the central axis of the casing 16. The casing is arranged so that its central axis lies parallel to a line of tangency to the ring 24 extending in the plane of the ring.

The ring 24 is preferably formed of plastic, integrally with the casing 16, and has a gap 26 in its perimeter at a point diametrically opposed to the point of connection of the ring to the casing 16. This gap allows the size of the ring to be resiliently adjusted to accommodate the finger size of the wearer.

The cable 14 makes electrical connection with a standard male connector plug 28. The plug is affixed to a flat metal plate 30 with the axis of the plug extending parallel to the plate. The plate 30 has a pair of slots 32 formed in two of its opposed edges. A pair of short straps 34 which are affixed at spaced points to a wrist strap 36 are adapted to pass through the slots 32 and refasten to the wrist strap 36, thereby removably securing the plate 30 to the wrist strap. The wrist strap has fasteners (not shown) formed on its opposed ends which allow it to be retained to the wrist of the wearer.

In use, the wearer slips the ring 24 over a finger, preferably the finger between the middle finger and the little finger, so that the casing 16 is positioned on the interior of the hand, with the opening 20 projecting toward the thumb. In this position the slot 22 faces the wearer's wrist.

The wrist band 36 is secured to the wearer's wrist so that the plug 28 lies parallel to the interior side of the wrist.

The plug 28 may then be connected to a female jack 40, formed on the end of a cable 42 which connects the suitable amplifying apparatus 44. The user may then hold a harmonica 46 in the normal manner and the microphone element is positioned in close alignment to the harmonica to pick up its sound. The player is free to move his hands and his body in any way without modifying the sound pick-up provided by the amplifier.

The embodiments of the invention in which an exclusive property or privilege is claimed are defined as follows:

1. A support for a microphone element comprising: a ring adapted to encircle a finger of a user; and a case for the microphone element in which one side of the case is attached to the ring on the outer edge thereof, the case having an opening adapted to receive the microphone element and a closed end portion for holding the microphone in the case.

2. The microphone element support of claim 1 wherein the ring has a discontinuous perimeter and is formed of a resilient material so that its size may be adjusted to accommodate various finger sizes.

3. The microphone support of claim 1 wherein the opening in the microphone case is disposed in a plane extending normally to a tangent through the outer edge of the ring at the point of attachment of the microphone case.

4. The microphone element support of claim 3 wherein the central axis of the cylindrical case and the central axis of the ring extend normally to one another.

5. The microphone element support of claim 3 including a slot formed in one cylindrical wall of the microphone case connecting to the open end of the case and adapted to receive a wire connected to the microphone element.

6. The microphone element support of claim 1 further including a wrist strap having an elecrical connector thereon adapted to receive the electrical leads extending from a microphone element.

7. A microphone support assembly comprising: a ring adapted to surround the finger of the wearer; a microphone element secured to the ring at an outer edge thereof; a wrist strap; an electrical connector secured on the wrist strap; and a wire extending between the electrical connector and the microphone element, whereby the microphone may be connected to an external circuit by means of a connector.

8. The microphone assembly of claim 7 wherein the microphone element consists of a case section and a removable element section and the case section is secured to the ring.

9. The microphone assembly of claim 8 wherein the case section is cylindrical and has its central axis extending parallel to the line of tangency through the edge of the ring, in the plane of the ring at the point of securement of the case to the ring.

10. The microphone assembly of claim 9 wherein the case has one open end adapted to receive the microphone element.

11. The microphone assembly of claim 10 wherein the case has a slot formed along its cylindrical side and connecting to its open end adapted to receive the wire.

12. A finger ring microphone comprising: a ring adapted to surround the finger of a wearer; and a microphone secured to an outer edge of the ring.

13. The finger ring microphone of claim 12 wherein the microphone is cylindrical and its central axis extends parallel to the line of tangency through the edge of the ring at the point of attachment of a case to the ring.

14. The finger ring microphone of claim 13 wherein the central axis of the microphone and the central axis of the ring extend normally to one another.

15. The finger ring microphone of claim 14 wherein the ring further includes means for adjusting its perimeter to thereby accommodate various finger sizes.

* * * * *

UNITED STATES PATENT AND TRADEMARK OFFICE
CERTIFICATE OF CORRECTION

PATENT NO. : 4,146,757
DATED : March 27, 1979
INVENTOR(S) : Jerry Murad

It is certified that error appears in the above-identified patent and that said Letters Patent are hereby corrected as shown below:

Column 2, line 33 "19" should be --18--.

Signed and Sealed this

Eighteenth Day of September 1979

[SEAL]

Attest:

LUTRELLE F. PARKER

*Attesting Officer*     *Acting Commissioner of Patents and Trademarks*